United States Patent [19]

Heier

[11] Patent Number: 4,925,430

[45] Date of Patent: May 15, 1990

[54] CROSS MEMBER FOR HOOKES UNIVERSAL JOINT

[75] Inventor: Dieter Heier, Gelsenkirchen, Fed. Rep. of Germany

[73] Assignee: Gelenkwellenbau GmbH, Essen, Fed. Rep. of Germany

[21] Appl. No.: 316,294

[22] Filed: Feb. 27, 1989

[30] Foreign Application Priority Data

Mar. 2, 1988 [DE] Fed. Rep. of Germany ....... 3806655

[51] Int. Cl.$^5$ .............................. F16D 3/41
[52] U.S. Cl. ...................... 464/14; 464/136
[58] Field of Search .............. 403/57, 265; 464/11, 464/14, 87, 136, 181, 185

[56] References Cited

U.S. PATENT DOCUMENTS

| | | | |
|---|---|---|---|
| 3,377,820 | 4/1968 | Smith, Jr. | 464/14 X |
| 3,611,751 | 10/1971 | Kleinschmidt | 464/14 |
| 4,116,019 | 9/1978 | Welschof | 464/14 X |

FOREIGN PATENT DOCUMENTS

| | | |
|---|---|---|
| 23292 | 7/1963 | Austria . |
| 3239075 | 5/1984 | Fed. Rep. of Germany . |
| 2934630 | 5/1985 | Fed. Rep. of Germany . |
| 3446495 | 12/1986 | Fed. Rep. of Germany . |
| 2593478 | 12/1986 | France . |
| 2102893 | 2/1983 | United Kingdom . |

OTHER PUBLICATIONS

"Konstruieren von Formteilen it Langfaserverstärkung", U. P. Behrenbeck et al, Der Konstrukteur 12/1986, 9/1986.

Primary Examiner—Daniel P. Stodola
Attorney, Agent, or Firm—Toren, McGeady & Associates

[57] ABSTRACT

A cross member (8) for a Hookes universal joint, comprising a body portion (20) and arms (19) extending outwardly therefrom, is made of a fibre reinforced plastics material including fibres (29) which extend between adjacent pairs of arms of the cross member. Each arm has an internal lubricant passage (11) which is of increasing cross sectional area in a portion (16) towards the free end of the arm, the lubricant passages being formed by use of a lost core during production of the cross member.

9 Claims, 3 Drawing Sheets

CROSS MEMBER FOR HOOKES UNIVERSAL JOINT

BACKGROUND OF THE INVENTION

Field of the Invention

This invention relates to a cross member for a Hookes universal joint. Such a cross member comprises a central body portion and four circumferentially spaced arms extending outwardly therefrom, the arms comprising a first oppositely disposed pair of arms having a common axis and a second oppositely disposed pair of arms having a common axis which intersects the axis of the first pair at right angles thereto. The arms have bearing surfaces for reception in bearing bushes, usually with the intermediary of roller members, and in a complete Hookes universal joint the bearing bushes are received in the yokes of the joint. The body portion and arms have internal passages for supply of lubricant to the bearings of the arms.

Hookes joint cross members are usually made as forged steel blanks which are subsequently machined, at least on the bearing surfaces of the arms. The lubricant passages are produced by drilling or boring the blanks.

SUMMARY OF THE INVENTION

It is broadly the object of the present invention to provide a cross member for a Hookes universal joint, which has optimised strength properties and is relatively cheap and simple to produce.

According to the invention, a cross member for a Hookes universal joint is made of a fibre reinforced plastics material, each arm being at least partly embraced by a respective sleeve affording a cylindrical outer bearing surface, and the body portion and arms being provided in the course of production of the cross member with internal lubricant passages.

When we state that the lubricant passages are provided in the course of production of the cross member, we mean that such passages are not provided by subsequently drilling or like operations on a complete or partially complete cross member.

In a cross member according to the invention, the provision on the arms of the sleeves having the outer bearing surfaces, for engagement by rollers in the bearing bushes in an assembled joint, gives an improved load distribution and thus a longer service life for the bearing surfaces of the arms of the cross member. Further, use of fibre reinforced plastics material gives the cross member vibration-damping properties. Provision of the internal lubricant passages during production of the cross member, instead of by subsequent drilling or the like, simplifies the production process. The shape of the cross member may be selected so that its strength is optimised. A final advantage is that, as a result of the use of the fibre reinforced plastics material for the cross member, the use of separate thrust washers, which are normally disposed between end faces of the arms and the bases of the associated bearing bushes, may not be necessary.

Each sleeve may be secured on its associated arm by use of an adhesive or by being pressed thereon. The security of each sleeve on its associated arm may be improved by providing the sleeve, at its end adjacent the end face of the arm, with a flange extending radially inwardly relative to the axis of the arm.

Preferably the lubricant passage in each arm has a cross-sectional area which increases as the passage extends from the body portion of the cross member towards the free end of the arm. This improves load distribution in the bearing rollers engaging the sleeve in an assembled joint, and hence the service life thereof. Preferably the wall thickness defined between the lubricant passage and the outer surface of each arm is greater in the plane containing the axes of all the arms than in the plane perpendicular thereto containing the axis of the respective arm.

Advantageous strength properties for the cross member are obtained if the concentration of fibres in the fibre reinforced plastics material increases in each arm with increasing distance from a plane which contains the arm axis and is perpendicular to the plane containing the axes of all the arms. Preferably fibres are disposed so as to connect each adjacent pair of arms, the fibres extending from the free end of one arm towards the body portion of the cross member, and then through the body portion and along the next adjacent arm towards the free end thereof.

The lubricant passages in the body portion and arms of the cross member may be formed in a "lost core" e.g. of a plastics material which, after application of the fibre reinforced plastics material thereto to form the cross member, remains in situ in the cross member to provide the lubricant passages.

BRIEF DESCRIPTION OF DRAWINGS

The invention will now be described by way of example with reference to the accompanying drawings, of which.

DESCRIPTION OF PREFERRED EMBODIMENT

Figure 1:
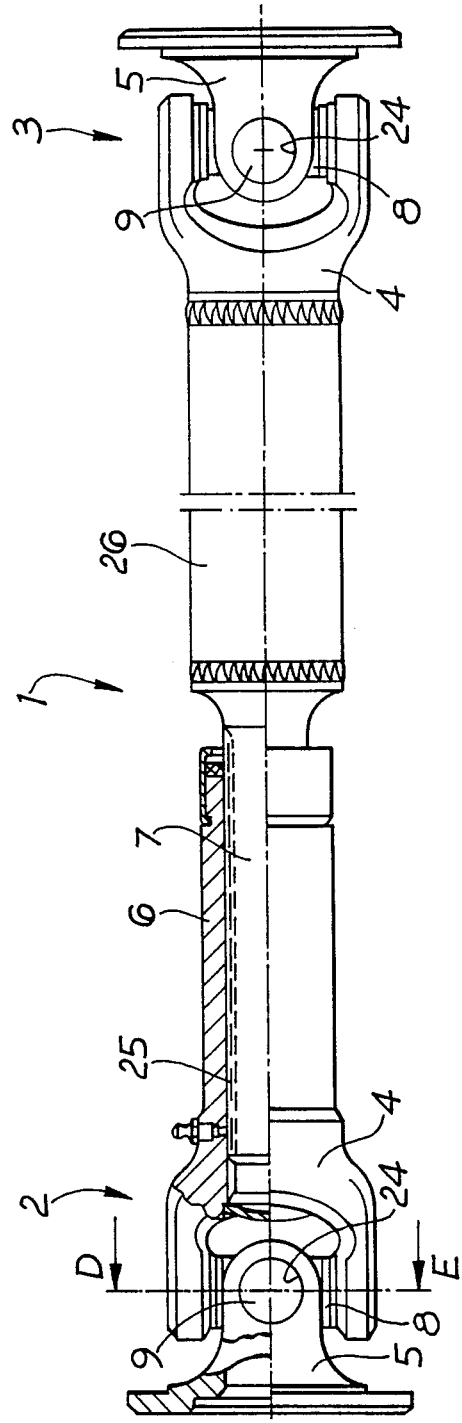
FIG. 1 is an elevation, partly in section, of a drive shaft having Hookes universal joints according to the invention.

Referring firstly to FIG. 1 of the drawings, there is shown a drive shaft indicated generally at 1 comprising two Hookes universal joints 2, 3. Each universal joint 2, 3 comprises two yokes 4, 5 connected to one another by a cross member 8. The yokes 5 are formed with driving flanges for bolted connection to other driving elements. The yoke 4 of joint 2 is connected to a sleeve 6, while the yoke 4 of joint 3 is connected to a tubular shaft element 26 itself connected to a solid shaft element 7 fitting within the sleeve 6. The sleeve 6 and shaft 7 are connected by inter-engaging splines 25, to transmit torque therebetween whilst allowing for a change in the overall length of the shaft assembly.

Figure 2:
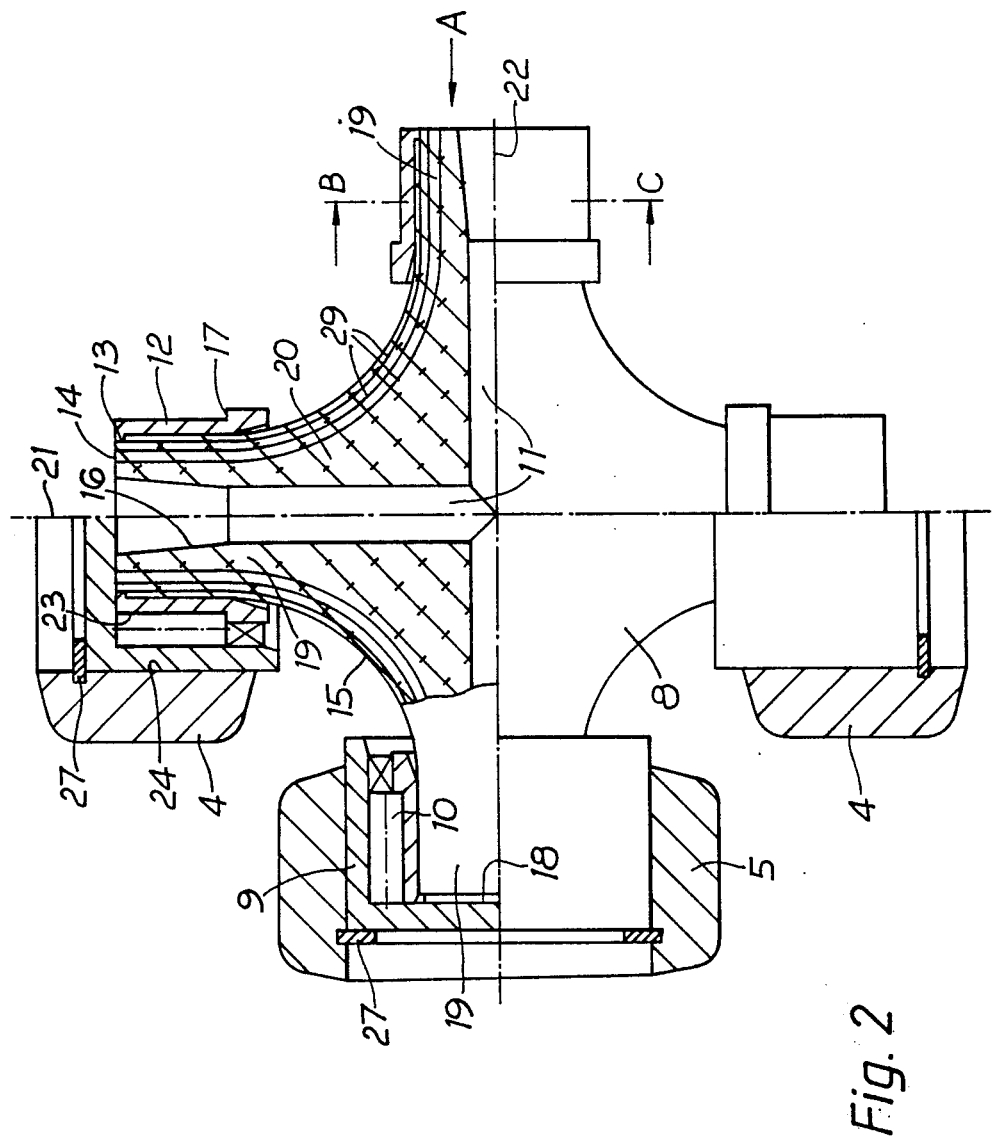
FIG. 2 is a composite section on the line D-E of FIG. 1, the left side of the figure showing part of the complete universal joint and the right half of the figure showing the cross member only thereof.

With additional reference now to FIG. 2 of the drawings, the cross member 8 comprises a body portion 20 and four arms 19 extending radially outwardly therefrom. There is a first oppositely disposed pair of arms 19 with a common axis 21, and a second oppositely disposed pair of arms with a common axis 22 which intersects the said first axis at right angles thereto, so that the axes of all the arms lie in a single plane. The arms with the common axis 21 are received in spaced limbs of the yoke 4, whilst the arms with the common axis 22 are received in spaced limbs of the yoke 5. Each of the arms is received in its respective yoke limb with the intermediary of a bearing bush 9 in the shape of a cup, received in a bore 24 in the limb of the yoke and retained therein by a spring retaining ring 27. Roller bearings 10, e.g. needle rollers, are disposed within the bearing bush as to support the arm for pivoting about its axis 21 or 22. An end face 14 of the arm abuts a bottom wall 18 at the closed end of the bearing bush.

The cross member 8 is made of a composite, fibre reinforced plastics, material, e.g. containing glass fibres and/or carbon fibres embedded in a suitable resin matrix. Each of the arms 19 has fitted thereon a respective sleeve 12 with a cylindrical outer bearing surface 23 which is engaged by the rollers 10 within the bearing bush. The sleeve 12 has, at its end which is at the free end of the arm 19, a flange or web 13 extending radially inwardly with regard to the axis 21 or 22 of the arm. At its other end, the sleeve 12 has a flange 17 extending radially outwardly having regard to the axis of the arm, which provides a stop face engaged by the ends of the rollers 10. Each sleeve 12 is secured to the associated arm 19 by use of an adhesive and/or by being pressed thereon.

Respective passages 11 for lubricant extend through the arms 19, the passages 11 meeting at the centre of the body part 20 of the cross member. Adjacent the centre of the body portion of the cross member each of the lubricant passages 11 is of cylindrical configuration, but as it approaches the free end of the associated arm 19 the passage is of increasing cross-sectional area. As shown more particularly in FIGS. 3 and 4 of the drawings, the dimension of the portion 16 of the lubricant passage increases in the plane (indicated at 28) which contains the axes 21, 22 of all the arms, but increases to a greater extent in the direction of a plane indicated at X—X which contains the arm axis and is perpendicular to the plane 28. Thus in the plane 28 the arm 19 has a greater wall thickness than in the plane X—X perpendicular to the plane 28.

The lubricant channels 11 and their portions 16 of increasing cross-sectional area may be provided in the cross member in a suitably shaped core upon which the fibre reinforced plastics material is applied to form the cross member, which core remains in situ in the finished cross member, i.e. a so-called "lost core". Such a core may be of a plastics material. Use of such a core avoids the necessity of having to drill the finished cross member to provide the lubricant passages therein, and renders it easy to achieve the particular cross-sectional shape of the lubricant passages.

Figure 3:
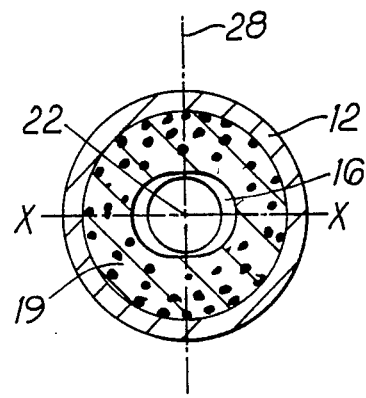
FIG. 3 is a section on the line B-C of FIG. 2.
Figure 4:
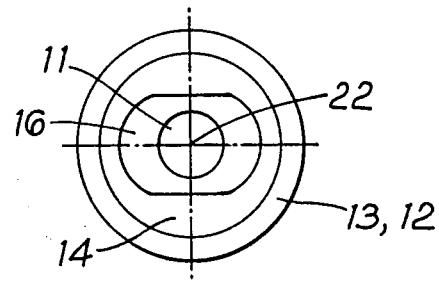
FIG. 4 is a view in the direction of arrow A of FIG. 2.

The disposition of fibres in the cross member include fibres 29 which, as shown in FIG. 2, extend from the free end of one arm 19 towards the body portion 20 of the cross member, and then follow the contour of the body portion in a curved region 15 thereof leading to the adjacent arm 19, wherein the fibres 29 extend to the free end of such adjacent arm. Such arrangement of fibres extending between adjacent arms 19 gives the cross member advantageous strength for torque transmission in the universal joint. Further, the concentration of the fibres is greater with increasing distance from the axis of the arm, and also with increasing distance from the plane X—X. The disposition of such an increasing number of fibres is illustrated in FIG. 3 of the drawings. This disposition of fibres is advantageous for the torque transmitting properties of the cross member both in the arms and in the body portion 20 thereof, where the fibres 29 are concentrated away from the centre of the body portion and adjacent the curved surface 15 between adjacent arms.

The increasing cross-sectional area of the lubricant passages 11 in their parts 16 closest to the free ends of the arms 19 gives improved distribution of load in the rollers 10 supporting the arms.

I claim:

1. A cross member for a Hookes universal joint, comprising a body portion; four circumferentially spaced arms extending outwardly from the body portion, the arms comprising a first oppositely disposed pair thereof having a common axis and a second oppositely disposed pair thereof having a common axis which intersects the axis of the first pair at right angles thereto; the body portion and arms being made of a fibre reinforced plastics material; each arm being provided with a respective sleeve at least partly embracing the arm, said sleeve affording a cylindrical outer bearing surface; the body portion and arms being provided in the course of production of the cross member with internal lubricant passages.

2. A cross member according to claim 1 wherein each sleeve is pressed on the associated arm.

3. A cross member according to claim 1 wherein each sleeve is secured by adhesive on the associated arm.

4. A cross member according to claim 1 wherein each sleeve is provided, at an end adjacent an end face of the associated arm, with a flange extending radially inwardly relative to the axis of the arm.

5. A cross member according to claim 1 wherein the lubricant passage in each arm has a cross-sectional area which increases as the passage extends from the body portion of the cross member towards the free end of the arm.

6. A cross member according to claim 5 wherein each arm has a wall thickness defined between the lubricant passage therein and an outer surface thereof, which wall thickness is greater in a plane containing the axes of all the arms than in a plane perpendicular to said plane and containing the axis of the respective arm.

7. A cross member according to claim 1 comprising fibres which extend from the free end of one arm towards the body portion of the cross member, then through the body portion and along the next adjacent arm towards the free end thereof.

8. A cross member according to claim 7 wherein said fibres are disposed in each arm in greater numbers with increasing distance from a plane which contains the arm axis and is perpendicular to a plane containing the axes of all the arms.

9. A cross member according to claim 1 wherein said lubricant passages are provided in a core remaining in the cross member.

* * * * *